(12) United States Patent  
Kitajima

(10) Patent No.: US 12,011,737 B2
(45) Date of Patent: Jun. 18, 2024

(54) PRINTED MATTER, GLOSS IMPARTING METHOD, AND METHOD FOR MANUFACTURING PRINTED MATTER

(71) Applicant: SEIREN CO., LTD, Fukui (JP)

(72) Inventor: Hiroshi Kitajima, Fukui (JP)

(73) Assignee: SEIREN CO., LTD, Fukui (JP)

(*) Notice: Subject to any disclaimer, the term of this patent is extended or adjusted under 35 U.S.C. 154(b) by 654 days.

(21) Appl. No.: 17/252,656

(22) PCT Filed: Jun. 21, 2019

(86) PCT No.: PCT/JP2019/024801
§ 371 (c)(1),
(2) Date: Dec. 15, 2020

(87) PCT Pub. No.: WO2020/004283
PCT Pub. Date: Jan. 2, 2020

(65) Prior Publication Data
US 2021/0252552 A1    Aug. 19, 2021

(30) Foreign Application Priority Data

Jun. 29, 2018 (JP) ................................. 2018-124937

(51) Int. Cl.
*B05D 1/26* (2006.01)
*B05D 5/06* (2006.01)
(Continued)

(52) U.S. Cl.
CPC .................. *B05D 1/26* (2013.01); *B05D 5/06* (2013.01); *B32B 3/30* (2013.01); *B32B 7/023* (2019.01); *B41J 2/01* (2013.01); *B41M 3/06* (2013.01)

(58) Field of Classification Search
None
See application file for complete search history.

(56) References Cited

U.S. PATENT DOCUMENTS

| | | |
|---|---|---|
| 6,326,074 B1 | 12/2001 | Takahashi |
| 2011/0177303 A1 | 7/2011 | Suehiro et al. |

(Continued)

FOREIGN PATENT DOCUMENTS

| | | |
|---|---|---|
| JP | H1132084 A | 2/1999 |
| JP | 2007260501 A | 10/2007 |

(Continued)

OTHER PUBLICATIONS

International Search Report dated Jul. 16, 2019; International Application No. PCT/JP2019/024801.

*Primary Examiner* — Joshua D Zimmerman
(74) *Attorney, Agent, or Firm* — Dinsmore & Shohl LLP

(57) ABSTRACT

A printed matter has a substrate and a glossy layer provided on the substrate. The substrate is at least one selected from the group consisting of a steel plate, a metal plate, a plastic plate, a film, a ceramic plate, concrete, wood, glass, and fabric (the substrate is not a transparent member), wherein the glossy layer comprises a translucent ink, wherein on a surface of the substrate, a first region including a first protrusion formed along a first direction in a plane and a second region including a second protrusion formed along a second direction different from the first direction are formed, and wherein the first protrusion includes a curved part which is curved from the first direction to the second direction and connected to the second region.

8 Claims, 3 Drawing Sheets

(51) Int. Cl.
*B32B 3/30* (2006.01)
*B32B 7/023* (2019.01)
*B41J 2/01* (2006.01)
*B41M 3/06* (2006.01)

(56) References Cited

U.S. PATENT DOCUMENTS

2015/0204133 A1 7/2015 Luetgert et al.
2016/0222667 A1 8/2016 Anderson et al.

FOREIGN PATENT DOCUMENTS

| | | |
|---|---|---|
| JP | 2007331232 A | 12/2007 |
| JP | 200818631 A | 1/2008 |
| JP | 2009160534 A | 7/2009 |
| JP | 2014195914 A | 10/2014 |
| JP | 201622615 A | 2/2016 |
| JP | 2016022615 A * | 2/2016 |
| WO | 2010013667 A1 | 2/2010 |

* cited by examiner

PRINTED MATTER, GLOSS IMPARTING METHOD, AND METHOD FOR MANUFACTURING PRINTED MATTER

CROSS REFERENCE TO RELATED APPLICATIONS

This application is the U.S. national stage of PCT/JP2019/024801 filed Jun. 21, 2019, which claims priority of Japanese patent application 2018-124937 filed Jun. 29, 2018, both of which are hereby incorporated by reference in their entirety.

FIELD OF THE INVENTION

The present invention relates to a printed matter, a gloss-imparting method, and a manufacturing method of the printed matter. More specifically, the present invention relates to a printed matter in which a special surface gloss (luster) is imparted to a substrate of various picture patterns by providing a plurality of regions having different glosses on the surface of the substrate, a gloss-imparting method, and a manufacturing method of the printed matter.

BACKGROUND OF THE INVENTION

Conventionally, a decorative sheet having a picture pattern such as a wood pattern or metallic pattern on a surface of a substrate have been developed. Patent Document 1 discloses a decorative sheet having a wood pattern on a surface of a substrate. Besides, a bark of a particular wood such as hard maple or mahogany exhibits a special surface gloss (luster) referred to as Moku (quilt moku). Such a surface gloss is said to be caused by light reflection or scattering from a cell-interior of wood that have received light, shines so that a design pattern sterically weaves depending on a viewing angle, and exhibits excellent design and luxury. Due to limited types of wood that exhibit such quilt moku and existence of various strength also in quilt moku, wood that exhibit strong quilt moku is often traded at a high price.

A relevant document is JP H11 32084.

SUMMARY OF THE INVENTION

A wood pattern formed by the invention described in JP H11 32084 cannot impart a special surface gloss (luster) having a three-dimensional effect like quilt moku. In addition, a printed matter imparted with various picture patterns with such a special surface gloss (for example, a picture pattern in which a three-dimensional special surface gloss (luster) like the above-described quilt moku which cannot be originally generated with metal is imparted to a metallic picture pattern) is not known.

The present invention has been made in view of such a conventional problem, and it is an object of the present invention to provide a printed matter in which a special surface gloss (luster) is expressed on various picture patterns, a gloss-imparting method, and a manufacturing method of the printed matter.

The present inventor has found that the above-described problem can be appropriately solved by forming a plurality of regions each including a plurality of protrusions each extending along different directions on a surface of a substrate by use of a translucent ink and utilizing difference in gloss exhibited by each region as a visual effect, and completed the present invention.

The printed matter of the present invention that solves the above-described problem comprises a substrate and a glossy layer provided on the substrate, wherein the glossy layer comprises a translucent ink, and wherein on a surface of the substrate, a first region including a first protrusion formed along a first direction in a plane and a second region including a second protrusion formed along a second direction different from the first direction are formed.

Furthermore, the gloss-imparting method of the present invention that solves the above-mentioned problem is a gloss-imparting method of providing a glossy layer by applying a transparent ink on a substrate to impart a surface gloss, comprising a step of applying the transparent ink so as to form on a surface of the glossy layer a first region including a first protrusion formed along a first direction in a plane and a second region including a second protrusion formed along a second direction different from the first direction.

Furthermore, the manufacturing method of a printed matter of the present invention that solves the above-mentioned problem is a manufacturing method of a printed matter having a surface gloss, comprising an ink-applying step of applying a translucent ink on a substrate to provide a glossy layer by an inkjet method, the ink-applying step being a step of applying the transparent ink so as to form on a surface of the substrate a first region including a first protrusion formed along a first direction in a plane and a second region including a second protrusion formed along a second direction different from the first direction.

Furthermore, the printed matter of the present invention that solves the above-described problem more appropriately comprises a substrate and a glossy layer provided on the substrate, the substrate being at least one selected from the group consisting of a steel plate, a metal plate, a plastic plate, a film, a ceramic plate, concrete, wood, glass, and fabric (the substrate is not a transparent member), wherein the glossy layer comprises a translucent ink, wherein on a surface of the substrate, a first region including a first protrusion formed along a first direction in a plane and a second region including a second protrusion formed along a second direction different from the first direction are formed, and wherein the first protrusion includes a curved part which is curved from the first direction to the second direction and connected to the second region.

Furthermore, the gloss-imparting method of the present invention that solves the above-mentioned problem more appropriately is a gloss-imparting method of providing a glossy layer by applying a transparent ink on a substrate to impart a surface gloss, the substrate being at least one selected from the group consisting of a steel plate, a metal plate, a plastic plate, a film, a ceramic plate, concrete, wood, glass, and fabric (the substrate is not a transparent member), comprising a step of applying the transparent ink so as to form on a surface of the glossy layer a first region including a first protrusion formed along a first direction in a plane and a second region including a second protrusion formed along a second direction different from the first direction, wherein the first protrusion is formed so as to include a curved part which is curved from the first direction to the second direction and connected to the second region.

Furthermore, the manufacturing method of a printed matter of the present invention that solves the above-described problem more appropriately is a manufacturing method of a printed matter having a surface gloss, comprising an ink-applying step of applying a translucent ink on a substrate to provide a glossy layer by an inkjet method, the ink-applying step being a step of applying the transparent ink so as to form on a surface of the substrate a first region including a first protrusion formed along a first direction in a plane and a second region including a second protrusion formed along a second direction different from the first direction, wherein the first protrusion is formed so as to include a curved part which is curved from the first direction to the second direction and connected to the second region, and wherein the substrate is at least one selected from the group consisting of a steel plate, a metal plate, a plastic plate, a film, a ceramic plate, concrete, wood, glass, and fabric (the substrate is not a transparent member).

Furthermore, the printed matter of the present invention that solves the above-described problem more appropriately comprises a substrate and a glossy layer provided on the substrate, wherein the glossy layer comprises a translucent ink, wherein on a surface of the substrate, a first region including a first protrusion formed along a first direction in a plane and a second region including a second protrusion formed along a second direction different from the first direction are formed, the substrate being a translucent substrate, and the printed matter further comprises a design layer, wherein the substrate, the glossy layer, and the design layer are sequentially formed, and wherein the first protrusion includes a curved part which is curved from the first direction to the second direction and connected to the second region.

EMBODIMENT FOR CARRYING OUT THE INVENTION

<Printed Matter>

Figure 1:
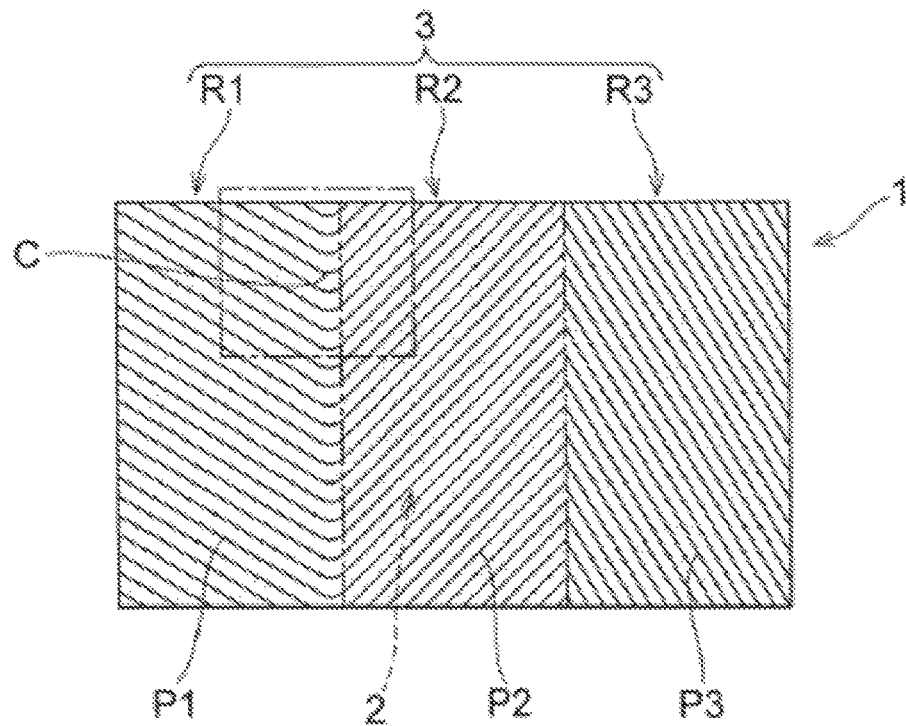
FIG. 1 is a schematic plane view of a printed matter according to one embodiment of the present invention.

The printed matter according to one embodiment of the present invention comprises a substrate and a glossy layer provided on the substrate. FIG. 1 is a schematic plane view of a printed matter 1 of the present embodiment. The glossy layer 3 comprises a translucent ink, and on a surface of a substrate 2, a first region R1 including a first protrusion P1 formed along a first direction in the plane and a second region R2 including a second protrusion P2 formed along a second direction different from the first direction are formed. Each component is described below.

(Substrate 2)

The substrate 2 is not particularly limited. The substrate 2 may be a transparent substrate exhibiting translucency or may be an opaque substrate other than the transparent substrate. For example, the substrate 2 is a metal plate such as a steel plate, aluminum, and stainless steel, a plastic plate or film such as acrylic, polycarbonate, ABS, polypropylene, polyester, and vinyl chloride, a ceramic plate, concrete, wood, glass, or the like. Furthermore, the substrate 2 may be fabric, etc. consisting of a polyester-based fiber such as a cationic dyeable polyester (CDP) fiber, a polyethylene terephthalate (PET) fiber, a polybutylene terephthalate (PBT) fiber, a polytrimethylene terephthalate (PTT) fiber, a total aromatic polyester fiber, and a polylactic acid fiber, an acetate fiber, a triacetate fiber, a polyurethane fiber, a nylon fiber, and the like, or a composite fiber thereof. They can be appropriately selected according to their application. When the substrate 2 is fabric, fabric is preferably treated with a pretreatment agent before printing. Examples of the pretreatment agent include a water-soluble polymer, a water-insoluble inert organic compound, a flame retardant, a UV absorber, a reduction inhibitor, an antioxidant, a pH regulator, a hydrotropic agent, an anti-foaming agent, a penetrating agent, a microporous-forming agent, and the like. Examples of a method of applying these pretreatment agents to fabric include a pad method, a spray method, a dipping method, a coating method, a laminating method, a gravure method, an inkjet method, and the like. Moreover, in the present embodiment, the transparent substrate refers to a substrate having transparency enough to allow an arranged drawing pattern to be visually recognized from a front surface side when, for example, a drawing pattern or the like is arranged on a back surface side of the substrate. In addition, the substrate of the present embodiment may be coated, pretreated, or the like on at least one of the front surface and the back surface. In this case, the substrate whose transparency has been lost by coating or pretreatment is included in an opaque substrate that is not a transparent substrate.

The printed matter 1 of the present embodiment can impart a special surface gloss (luster) as shown by a particular wood. Therefore, for example, in the case that the substrate 2 is a wood raw material, even when a wood raw material that does not exhibit a special surface gloss (luster) is used as the substrate 2, the printed matter 1 can impart a special surface gloss (luster) as shown by a particular wood to such substrate 2. Therefore, the printed matter 1 has a wide range of selection for a material of the substrate 2 and can give various added values such as cost reduction and mass production.

Similarly, when the substrate 2 is a raw material other than wood (for example, a plastic plate, etc. such as the above-described polycarbonate plate), the printed matter 1 can impart a special surface gloss (luster) as shown by a particular wood to the substrate 2 made of a raw material that does not originally exhibit a special surface gloss (luster). Therefore, the printed matter 1 has a wide range of selection for a material of the substrate 2 and can give various added values such as weight reduction, cost reduction, and mass production. Furthermore, the obtained printed matter 1 can be a printed matter consisting of plastic, fabric, or the like, which has been imparted with a special surface gloss (luster) as shown by a particular wood, and which has never existed in the past. Since such printed matter 1 exhibits a special surface gloss, it can demonstrate an unprecedented design property.

(Glossy Layer 3)

The glossy layer 3 is a layer provided on the substrate 2 and formed by applying a translucent ink by an inkjet method. The translucent ink is not particularly limited. For example, the translucent ink is a water-based ink, a solventbased ink, a solvent-free (monomer-diluted) ink, or the like. A resin to be added to the translucent ink is not particularly limited. For example, the resin is an ultraviolet curable resin, a thermoplastic resin, a thermosetting resin, or the like.

In the glossy layer 3, on the surface of the substrate 2, a first region R1 including a first protrusion P1 formed along a first direction in a plane and a second region R2 including a second protrusion P2 formed along a second direction different from the first direction are formed. Besides, the number of regions provided on the glossy layer 3 of the present embodiment may be 2 or more. FIG. 1 illustrates a case where a surface layer including three regions is provided. The first region R1 and the second region R2 are optional regions selected from these three regions.

First Region R1

The first region R1 is a region in which a first protrusion P1 extending along a predetermined direction (a first direction) is formed. The first protrusion P1 is a projection extending in the first direction on the surface of the glossy layer 3. The first region R1 reflects light and exhibits a desired gloss due to the formation of the first protrusion P1.

Figure 2:
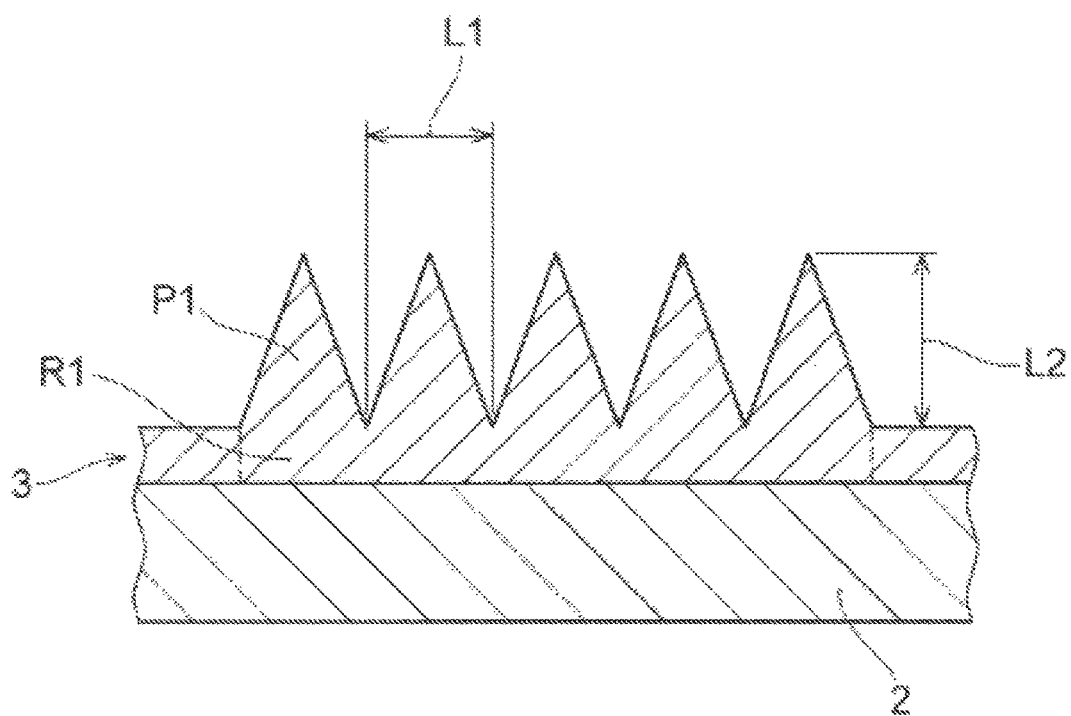
FIG. 2 is a schematic cross-sectional view of a first protrusion.

A shape of the first protrusion P1 is not particularly limited. FIG. 2 is a schematic cross-sectional view of the first protrusion P1. As shown in FIG. 2, the first protrusion P1 of the present embodiment has a serrated vertical cross-sectional shape from a base end portion to a tip end portion, and a plurality of first protrusions P1 are formed so as to be adjacent to each other. The cross-sectional shape of the first protrusion P1 may be other shapes (for example, an elliptical shape, a rectangular shape, etc.) in addition to such a serrated shape. Furthermore, the cross-sectional shape of each of the first protrusions P1 may be different.

A width (L1) of each first protrusion P1 is not particularly limited. The width (L1) of the first protrusion P1 is appropriately set so as to produce a desired gloss. For example, the width (L1) of the first protrusion P1 is preferably 10 μm or more, and more preferably 30 μm or more. Furthermore, the width (L1) of the first protrusion P1 is preferably 1,000 μm or less, and more preferably 500 μm or less. When the width (L1) of the first protrusion P1 is within the above-described ranges, the first region R1 is likely to exhibit a desired gloss. Besides, the width (L1) of each first protrusion P1 may be different.

A height (L2) of each first protrusion P1 is not particularly limited. The height (L2) of the first protrusion P1 is appropriately set so as to produce a desired gloss. For example, the height (L2) of the first protrusion P1 is preferably 30 μm or more, and more preferably 50 μm or more. Furthermore, the height (L2) of the first protrusion P1 is preferably 1,000 μm or less, and more preferably 200 μm or less. When the height (L2) of the first protrusion P1 is within the above-described ranges, the first region R1 is likely to exhibit a desired gloss. Besides, the height (L2) of each first protrusion P1 may be different.

An angle of each first protrusion P1 with respect to the substrate 2 is not particularly limited. The angle with respect to the substrate 2 can be appropriately adjusted by the width (L1) and height (L2) of the first protrusion P1. For an example, the angle with respect to the substrate 2 is preferably more than 0° and less than 180°, and more preferably 10° or more and 170° or less.

Figure 3:
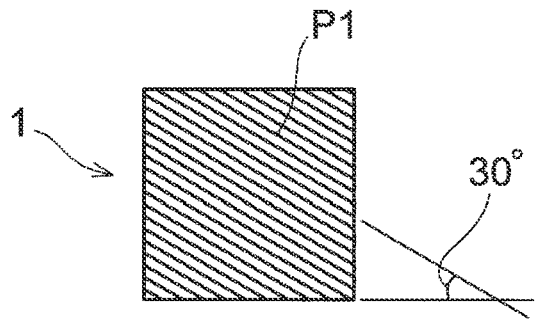
FIG. 3 is a schematic plane view showing an extending angle of the first protrusion.
Figure 4:
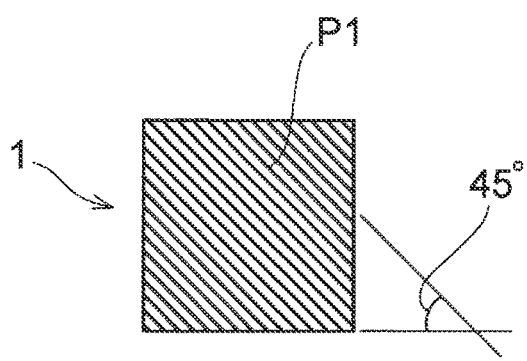
FIG. 4 is a schematic plane view showing an extending angle of the first protrusion.
Figure 5:
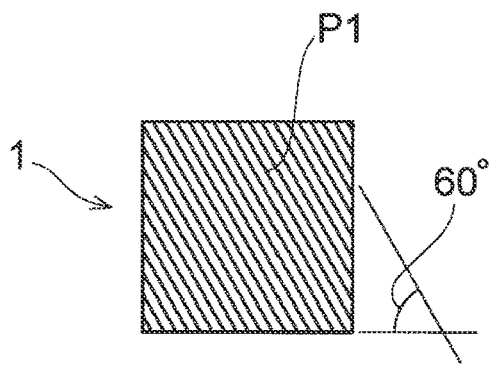
FIG. 5 is a schematic plane view showing an extending angle of the first protrusion.

An extending direction of the first protrusion P1 may be different from an extending direction of the second protrusion P2 of the second region R2 which will be described later. That is, the extending direction of the first protrusion P1 may be in a direction of any angle of 0 to 180° with respect to one lateral side of the printed matter 1 in a top view (but is different from an extending direction of the second protrusion P2). FIGS. 3 to 5 are schematic plane views showing an extending angle of the first protrusion P1. The extending direction of the first protrusion P1 may be 30° (see FIG. 3), 45° (see FIG. 4), or 60° (see FIG. 5) with respect to one lateral side of the printed matter 1 in a top view.

Second Region R2

The second region R2 is a region in which a second protrusion P2 extending along a predetermined direction (a second direction) different from the first direction is formed. The second protrusion P2 is a projection extending in the second direction on the surface of the glossy layer 3. The second region R2 reflects light and exhibits a desired gloss different from that produced by the first region R1 due to the formation of the second protrusion P2. Therefore, an observer who observes the printed matter 1 can obtain a visual effect based on a gloss difference by simultaneously observing a plurality of regions (a first region R1 and a second region R2) having different glosses.

The second direction may be different from the first direction. That is, an angle of the second direction with respect to the first direction is not particularly limited. For example, the second direction is preferably tilted by 10° or higher, and preferably 20° or higher, with respect to the first direction in the plane of the substrate 2 (that is, a top view shown in FIG. 1). Furthermore, the second direction is preferably tilted by 80° or lower, and preferably 70° or lower, with respect to the first direction in the plane direction of the substrate 2. When the second direction is tilted at an angle within the above-described ranges with respect to the first direction, a gloss difference between gloss produced by the second region R2 and gloss produced by the first region R1 is likely to be caused. Therefore, an observer who observes the printed matter 1 can obtain a visual effect based on a larger gloss difference. In addition, as will be described later, when the first protrusion P1 and the second protrusion P2 have, for example, a curved shape, not a linear shape, the angle of the second direction with respect to the first direction may vary as appropriate, preferably in the range of 10 to 80°. Moreover, when the first protrusion P1 and the second protrusion P2 are not in a linear shape, they may partially have the same angle in the first direction and the second direction.

The second protrusion P2 have a similar shape, width, and height with respect to the first protrusion P1, which are not particularly limited.

All of the above-described shapes of the first protrusion P1 and the second protrusion P2 are not limited to a linear shape. That is, the first protrusion P1 may include a portion formed along a direction different from that of the second protrusion P2. Therefore, both the first protrusion P1 and the second protrusion P2 may include a curved portion C. The first protrusion P1 may be curved at the curved portion C so as to be connected to the second protrusion P2 at an end close to the second protrusion P2. Therefore, in the printed matter 1, the first region R1 and the second region R2 showing different glosses are connected more smoothly. As a result, the printed matter 1 can gradually change gloss from gloss derived from the first region R1 to gloss derived from the second region R2 and express a more natural and three-dimensional special surface gloss (luster).

Referring back to the description of the entire glossy layer 3, the above-described first region R1 and second region R2 may be formed on the entire surface of the substrate 2 or may be formed on a part of the surface of the substrate 2. When the first region R1 and the second region R2 are formed on a part of the surface of the substrate 2, the remaining region may be a region in which a glossy layer 3 is formed flat, an exposed surface of the substrate 2 in which no glossy layer 3 is formed, or a third region R3 including a third protrusion P3 formed along a direction different from that of the first protrusion P1 and the second protrusion P2. Besides, the third protrusion P3 is similar with the above-described first protrusion P1 or second protrusion P2.

The printed matter 1 shown in FIG. 1 is formed so that the first region R1 and the second region R2 are adjacent to each other. Furthermore, in the printed matter 1, in addition to the first region R1 and the second region R2, a third region R3 including a third protrusion P3 is formed. Therefore, in the printed matter 1, a region including a predetermined protrusion is formed on the entire surface of the glossy layer 3. When such third region R3 is formed, the printed matter 1 can exhibit a more three-dimensional special surface gloss (luster) due to an influence of respective gloss based on the first region R1 to the third region R3 and of a gloss difference based on these glosses.

Figure 6:
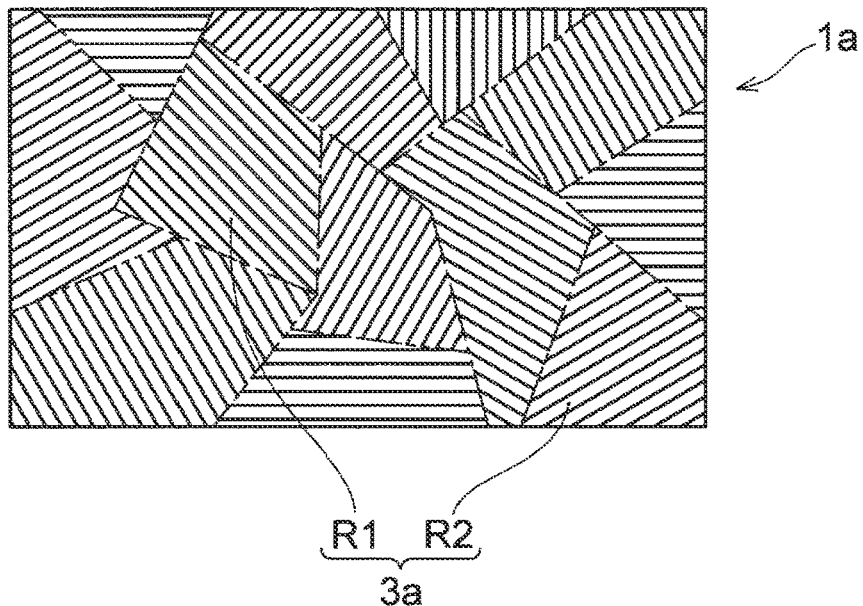
FIG. 6 is a schematic plane view with respect to a modified example of a printed matter according to one embodiment of the present invention.

Furthermore, the first region R1 and the second region R2 may be formed so as to be separated from each other. FIG. 6 is a schematic plane view with respect to a modified example of a printed matter (a printed matter 1a) of the present embodiment. As shown in FIG. 6, on a glossy layer 3a of the printed matter 1a, a first region R1 and a second region R2 formed at a position separated from the first region R1 are formed. Therefore, the printed matter 1a can exhibit a different surface gloss (luster) as compared with the case where the first region R1 and the second region R2 are formed so as to be adjacent to each other (see FIG. 1).

In order for the printed matter 1 of the present embodiment to well express a special surface gloss (luster) as shown by a particular wood, each area of the first region P1 and the second region P2 is preferably formed so as to be 1 mm 2 or more, and more preferably 5 mm 2 or more. When the area of the region is within the above-described ranges, the printed matter 1 is likely to make gloss and a gloss difference derived from each region recognizable for an observer and to demonstrate a visual effect of a special surface gloss.

Figure 7:
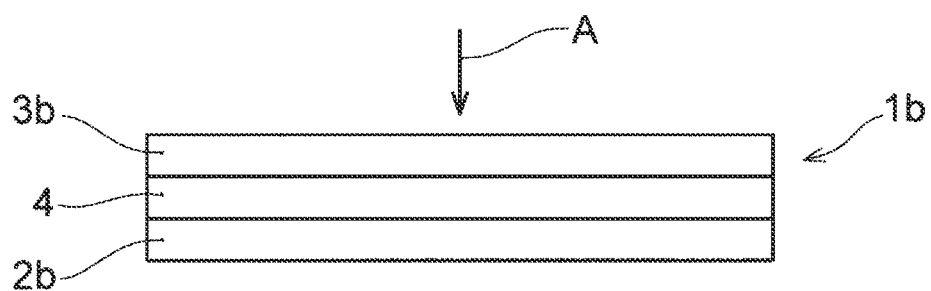
FIG. 7 is a schematic view for explaining a layer structure of a printed matter provided with a design layer between a substrate and a glossy layer.

Referring back to the description of the entire printed matter, the printed matter of the present embodiment may be provided with a design layer between the substrate and the glossy layer. FIG. 7 is a schematic view for explaining a layer structure of a printed matter (a printed matter 1b) provided with a design layer 4 between a substrate 2b and a glossy layer 3b. Besides, in FIG. 7, an arrow A indicates a direction in which light is incident.

The design layer 4 is not particularly limited. For example, the design layer 4 is a layer in which various drawing patterns and design patterns are formed, and which various wood, metallic, carbon, synthetic leather, natural leather, stone patterns, and various geometric patterns, photographs and the like are formed. In the printed matter 1b, a glossy layer 3b comprising the above-mentioned translucent ink is formed on such a design layer 4. Therefore, the printed matter 1b is a product that reflects light on the surface and is imparted with a special surface gloss (luster) as shown by a particular wood with respect to the design layer 4 on which various drawing patterns and design patterns are formed.

Furthermore, the design layer 4 is preferably a layer on which a wood pattern is printed. With such a wood pattern being printed, the printed matter 1b can form a wood pattern imparted with a special surface gloss (luster) as shown by a particular wood even when a substrate 2b other than wood is used. Therefore, the printed matter 1b has a wide range of selection for a material of the substrate 2b and is given various added values such as weight reduction and cost reduction.

Figure 8:
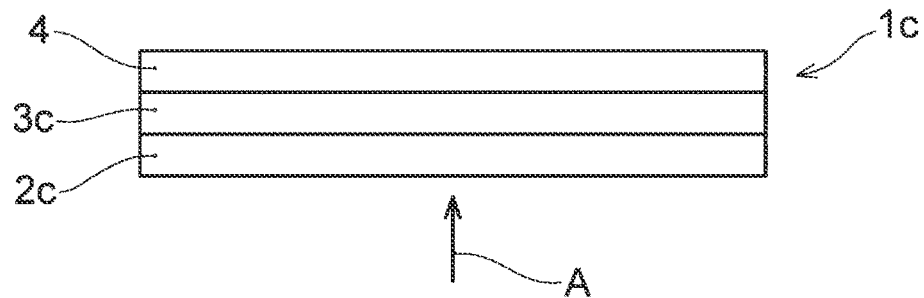
FIG. 8 is a schematic view for explaining a layer structure of a printed matter provided with a design layer on a glossy layer.

Furthermore, in the printed matter, when a translucent substrate is adopted as a substrate 2c, the above-described glossy layer 3c may be formed on the substrate 2c, and also the above-described design layer 4 may be formed on the glossy layer 3c. FIG. 8 is a schematic view for explaining a layer structure of a printed matter 1c provided with a design layer 4 on the glossy layer 3c. Besides, in FIG. 8, an arrow A indicates a direction in which light is incident. Such a printed matter 1c is a product that reflects light on the back surface since the substrate 2c exhibits translucency, and is imparted with a special surface gloss (luster) as shown by a particular wood with respect to the design layer 4 on which various drawing patterns and design patterns are formed.

A translucent material constituting the substrate 2c is not particularly limited. For example, the translucent material is an inorganic material such as glass, a water glass, a low melting point glass, a silicon resin, and alkoxysilane, or an organic material such as an acrylic resin, an acrylic-styrene resin, an acrylic silicon resin, a cellulose acetobutyrate resin, a cellulose propionate resin, a polymethylpentene resin, a polycarbonate resin, a polystyrene resin, a polyester resin, an epoxy resin, and an urethane resin.

In addition, a translucent material constituting the substrate 2c and a resin material constituting the glossy layer 3c are preferably of different types. That is, this is because that, when the translucent material constituting the substrate 2c and the resin material constituting the glossy layer 3c exhibit the same or similar translucency, it becomes difficult to discriminate a gloss difference between gloss produced by the first region R1 and gloss produced by the second region R2 once a glossy layer 3c is provided on the substrate 2c. When the translucent material constituting the substrate 2c is of a different type from the resin material constituting the glossy layer 3c, the printed matter 1c is less likely to be reduced in a gloss difference between gloss produced by the first region R1 and gloss produced by the second region R2 and is likely to exhibit a special surface gloss (luster) as shown by a particular wood.

As described above, according to the printed matter of the present embodiment, on the surface of the substrate, a first region including a first protrusion formed along a first direction in the plane and a second region including a second protrusion formed along a second direction different from the first direction are formed. Therefore, gloss due to reflection of light by the first protrusion of the first region and gloss due to reflection of light by the second protrusion of the second region simultaneously come into view of an observer who observes the printed matter, so that a visual effect based on difference in each gloss is obtained. Such a visual effect resembles a three-dimensional special surface gloss (luster) like quilt moku. As a result, the printed matter can exhibit a special surface gloss (luster) as shown by a particular wood.

Furthermore, the printed matter of the present embodiment can impart the above-described special surface gloss (luster) to various substrates. Therefore, the printed matter is utilized as various products or parts such as, for example, furniture, home electric appliances, automobile interior parts, and building materials and can give a high-grade sense, or the like, for these applications. Here, a type of the substrate of the printed matter is not particularly limited. Therefore, the printed matter can impart a special surface gloss to a wood pattern of wood which does not originally exhibit the above-described special surface gloss by, for example, printing a wood picture pattern on the substrate. Moreover, the printed matter can also impart the above-described special surface gloss to a substrate having another picture pattern (for example, a metallic pattern, a synthetic leather pattern, various geometric patterns, etc.) other than the wood pattern. Therefore, the obtained printed matter can express various designs that have never existed in the past.

In addition, both of the first and second protrusions of the present embodiment have a serrated shape which is sharp from a base end portion to a tip end portion, and is illustrated as a case where they are erected upward from the surface of the glossy layer (or the substrate). Shapes of the first protrusion and the second protrusion of the present embodiment are not limited to such an erected shape. That is, the first protrusion and the second protrusion may be formed by providing a plurality of grooves parallel to the surface of the glossy layer after the glossy layer having a predetermined thickness is formed.

<Manufacturing Method of Printed Matter>

The manufacturing method of a printed matter according to one embodiment of the present invention includes an ink-applying step of applying a translucent ink on a substrate to provide a glossy layer by an inkjet method. The ink-applying step is a step of applying a translucent ink so as to form on a surface of a substrate a first region including a first protrusion along a first direction in the plane and a second region including a second protrusion along a second direction different from the first direction. Each step is described below. In addition, the manufacturing method of a printed matter of the present embodiment is characterized by an ink-applying step. Therefore, steps other than the ink-applying step are similar with the steps adopted in the conventional methods for manufacturing a printed matter. Thus, the steps other than the ink-applying step shown below are examples, and designs thereof can be changed as appropriate.

(Ink-Applying Step)

The ink-applying step is a step of applying a translucent ink on a substrate by an inkjet method to provide a glossy layer. Here, the ink-applying step provides a translucent ink so as to form on a surface of a substrate a first region including a first protrusion along a first direction in the plane and a second region including a second protrusion along a second direction different from the first direction.

The inkjet method is not particularly limited. For example, the inkjet method is a continuous method such as a charge modulation method, a microdot method, a charge injection control method, and an ink mist method, an on-demand method such as a piezo method, a pulse jet method, a bubble jet (registered trademark) method, an electrostatic suction method, or the like. Furthermore, the inkjet method may be adopted for either a line type to fix a recording head for ejection onto a recording medium or a serial type to move the recording head relative to the recording medium.

An amount of ink applied is not particularly limited. The amount of ink applied can be appropriately adjusted according to a thickness of a glossy layer required to demonstrate a desired gloss difference, a size of the protrusions, and the like.

A substrate to which ink has been applied may be appropriately cured or dried.

As described above, according to the manufacturing method of a printed matter of the present embodiment, the obtained printed matter is imparted with gloss due reflection of light by the first protrusion of the first region and gloss due reflection of light by the second protrusion of the second region. These different glosses simultaneously come into view when an observer observes the printed matter, giving a visual effect based on difference in each gloss. Such a visual effect resembles a three-dimensional special surface gloss (luster) like quilt moku. As a result, the manufacturing method of a printed matter can impart a special surface gloss (luster) as shown by a particular wood to various substrates.

In addition, in the present embodiment, the case where a glossy layer is formed directly on a substrate is illustrated. Alternatively, the manufacturing method of a printed matter of the present embodiment may adopt a design layer-forming step of forming a design layer on a substrate before the ink-applying step described above. In this case, the design layer can be formed on the substrate by a known inkjet method. Next, the substrate, on which the design layer is formed, is provided with a glossy layer in the ink-applying step. The obtained printed matter is a product that reflects light on the surface, and is imparted with a special surface gloss (luster) as shown by a particular wood with respect to a design layer on which various drawing patterns and design patterns are formed.

<Gloss-Imparting Method>

The gloss-imparting method of one embodiment of the present invention is a gloss-imparting method of providing a glossy layer by applying a transparent ink on a substrate to impart a surface gloss. The gloss-imparting method includes a step of applying the transparent ink so as to form on a surface of the glossy layer a first region including a first protrusion formed along a first direction in the plane and a second region including a second protrusion formed along a second direction different from the first direction.

Besides, all of the substrate, the glossy layer, and the translucent ink used in the present embodiment are similar with those described above in the embodiments of the printed matter and the manufacturing method of the printed matter. Furthermore, a specific method of providing a glossy layer by applying a translucent ink on a substrate is as described above in relation to the embodiment of the manufacturing method of a printed matter.

According to the gloss-imparting method of the present embodiment, the obtained printed matter is imparted with gloss due reflection of light by the first protrusion of the first region and gloss due reflection of light by the second protrusion of the second region. These different glosses simultaneously come into view when an observer observes the printed matter, giving a visual effect based on difference in each gloss. Such a visual effect resembles a three-dimensional special surface gloss (luster) like quilt moku. As a result, the gloss-imparting method can impart a special surface gloss (luster) as shown by a particular wood to various substrates.

Furthermore, according to the gloss-imparting method of the present embodiment, it is possible to impart a special surface gloss (luster) as shown by a particular wood to a substrate other than a particular wood. Therefore, the gloss-imparting method can impart an advanced design, which could not have been conventionally achieved, to various substrates, and can produce a printed matter having an excellent design.

One embodiment of the present invention has been described above. The present invention is not particularly limited to the above-described embodiments. The above-described embodiments mainly explain inventions having the following configurations.

(1) A printed matter, comprising a substrate and a glossy layer provided on the substrate, wherein the glossy layer comprises a translucent ink, and wherein on a surface of the substrate, a first region including a first protrusion formed along a first direction in the plane and a second region including a second protrusion formed along a second direction different from the first direction are formed.

According to such a configuration, in the printed matter, on the surface of the substrate, a first region including a first protrusion formed along a first direction in the plane and a second region including a second protrusion formed along a second direction different from the first direction are formed. Therefore, gloss due to reflection of light by the first protrusion of the first region and gloss due to reflection of light by the second protrusion of the second region simultaneously come into view of an observer who observes the printed matter, so that a visual effect based on difference in each gloss is obtained. Such a visual effect resembles a three-dimensional special surface gloss (luster) like quilt moku. As a result, the printed matter can exhibit a special surface gloss (luster). Here, a type of the substrate of the printed matter is not particularly limited. Therefore, the printed matter can impart a special surface gloss to a wood pattern of wood which does not originally exhibit the above-described special surface gloss by, for example, printing a wood picture pattern on the substrate. Moreover, the printed matter can also impart the above-described special surface gloss to a substrate having another picture pattern (for example, a metallic pattern, a synthetic leather pattern, various geometric patterns, etc.) other than the wood pattern. Therefore, the obtained printed matter can express various designs that have never existed in the past.

(2) The printed matter of (1), wherein the second direction is tilted by 10 to 80° with respect to the first direction.

According to such a configuration, the printed matter can exhibit a special surface gloss (luster) more strongly.

(3) The printed matter of (1) or (2), wherein the first region and the second region are formed at positions separated from each other in a plane of the substrate.

According to such a configuration, the printed matter can exhibit a special surface gloss (luster) and change intensity of the surface gloss.

(4) The printed matter of (1) or (2), wherein the first region and the second region are formed at adjacent positions in the plane of the substrate.

According to such a configuration, the printed matter can exhibit a special surface gloss (luster) and change intensity of the surface gloss.

(5) The printed matter of (4), wherein the first protrusion is curved from the first direction to the second direction and comprises a curved portion connected to the second protrusion.

According to such a configuration, in the printed matter, the first region and the second region are connected by a curved portion. Therefore, the printed matter can express a more natural and three-dimensional special surface gloss (luster).

(6) The printed matter of any one of (1) to (5), further comprising a design layer between the substrate and the glossy layer.

According to such a configuration, the printed matter can impart a special surface gloss (luster) to the design layer on which various drawing patterns and design patterns are formed. In addition, the printed matter can be a product that reflects light on the surface.

(7) The printed matter of any one of (1) to (5), wherein the substrate is a translucent substrate, the printed matter further comprising a design layer, wherein the substrate, the glossy layer, and the design layer are formed in this order.

According to such a configuration, the printed matter can impart a special surface gloss (luster) to the design layer on which various drawing patterns and design patterns are formed.

Furthermore, the printed matter can be a product that reflects light on the back surface, since the substrate transmits light.

(8) The printed matter of (6) or (7), wherein the design layer is printed with a wood pattern.

According to such a configuration, the printed matter can form a wood pattern with a special surface gloss (luster) even when a substrate other than wood is used. Therefore, the printed matter has a wide range of selection for a material of the substrate and can give various added values such as weight reduction and cost reduction.

(9) The printed matter of any one of (1) to (7), wherein the substrate consists of a wood raw material.

According to such a configuration, the printed matter can impart a special surface gloss (luster) even when a wood raw material that does not exhibit a special surface gloss (luster) is used as a substrate. Therefore, the printed matter has a wide range of selection for a material of the substrate and can give various added values such as cost reduction.

(10) A gloss-imparting method of providing a glossy layer by applying a transparent ink on a substrate to impart a surface gloss, comprising a step of applying the transparent ink so as to form on a surface of the glossy layer a first region including a first protrusion formed along a first direction in a plane and a second region including a second protrusion formed along a second direction different from the first direction.

According to such a configuration, the obtained printed matter is imparted with gloss due reflection of light by the first protrusion of the first region and gloss due reflection of light by the second protrusion of the second region. These different glosses simultaneously come into view when an observer observes the printed matter, giving a visual effect based on difference in each gloss. Such a visual effect resembles a three-dimensional special surface gloss (luster) like quilt moku. As a result, the gloss-imparting method can impart a special surface gloss (luster) to various substrates.

(11) A manufacturing method of a printed matter having a surface gloss, comprising an ink-applying step of applying a translucent ink on a substrate to provide a glossy layer by an inkjet method, the ink-applying step being a step of applying the transparent ink so as to form on a surface of the substrate a first region including a first protrusion formed along a first direction in a plane and a second region including a second protrusion formed along a second direction different from the first direction.

According to such a configuration, the obtained printed matter is imparted with gloss due reflection of light by the first protrusion of the first region and gloss due reflection of light by the second protrusion of the second region. These different glosses simultaneously come into view when an observer observes the printed matter, giving a visual effect based on difference in each gloss. Such a visual effect resembles a three-dimensional special surface gloss (luster) like quilt moku. As a result, the manufacturing method of a printed matter can impart a special surface gloss (luster) to various substrates.

In addition, among the above-described configurations, the present invention preferably has the following configurations.

(A) A printed matter, comprising a substrate and a glossy layer provided on the substrate, the substrate being at least one selected from the group consisting of a steel plate, a metal plate, a plastic plate, a film, a ceramic plate, concrete, wood, glass, and fabric (except that the substrate is not a transparent member), wherein the glossy layer comprises a translucent ink, wherein on a surface of the substrate, a first region including a first protrusion formed along a first direction in a plane and a second region including a second protrusion formed along a second direction different from the first direction are formed, and wherein the first protrusion includes a curved part which is curved from the first direction to the second direction and connected to the second region.

(B) The printed matter of (A), wherein the second direction is tilted by 10 to 80° with respect to the first direction.

(C) The printed matter of (A) or (B), wherein the first region and the second region are formed at positions separated from each other in the plane of the substrate.

(D) The printed matter of (A) or (B), wherein the first region and the second region are formed at adjacent positions in the plane of the substrate.

(E) The printed matter of any one of (A) to (D), further comprising a design layer between the substrate and the glossy layer.

(F) The printed matter of (E), wherein the design layer is printed with a wood pattern.

(G) The printed matter of any one of (A) to (F), wherein the substrate consists of a wood raw material.

(H) A gloss-imparting method of providing a glossy layer by applying a transparent ink on a substrate to impart a surface gloss, the substrate being at least one selected from the group consisting of a steel plate, a metal plate, a plastic plate, a film, a ceramic plate, concrete, wood, glass, and fabric (the substrate is not a transparent member), comprising a step of applying the transparent ink so as to form on a surface of the glossy layer a first region including a first protrusion formed along a first direction in a plane and a second region including a second protrusion formed along a second direction different from the first direction, wherein the first protrusion is formed so as to include a curved part which is curved from the first direction to the second direction and connected to the second region.

(I) A manufacturing method of a printed matter having a surface gloss, comprising an ink-applying step of applying a translucent ink on a substrate to provide a glossy layer by an inkjet method, the ink-applying step being a step of applying the transparent ink so as to form on a surface of the substrate a first region including a first protrusion formed along a first direction in a plane and a second region including a second protrusion formed along a second direction different from the first direction, wherein the first protrusion is formed so as to include a curved part which is curved from the first direction to the second direction and connected to the second region, and wherein the substrate is at least one selected from the group consisting of a steel plate, a metal plate, a plastic plate, a film, a ceramic plate, concrete, wood, glass, and fabric (the substrate is not a transparent member).

(J) A printed matter, comprising a substrate and a glossy layer provided on the substrate, wherein the glossy layer comprises a translucent ink, wherein on a surface of the substrate, a first region including a first protrusion formed along a first direction in a plane and a second region including a second protrusion formed along a second direction different from the first direction are formed, the substrate being a translucent substrate, the printed matter further comprising a design layer, wherein the substrate, the glossy layer, and the design layer are sequentially formed, and wherein the first protrusion includes a curved part which is curved from the first direction to the second direction and connected to the second region.

EXPLANATION OF NUMERALS 1, 1a, 1b, 1c Printed matter
2, 2b, 2c Substrate
3, 3a, 3b, 3c Glossy layer
4 Design layer
L1 Width of first protrusion
L2 Height of first protrusion
P1 First protrusion
P2 Second protrusion
P3 Third protrusion
R1 First region
R2 Second region
R3 Third region

The invention claimed is:

1. A printed matter, comprising:
a substrate and a glossy layer provided on the substrate;
the substrate being at least one selected from the group consisting of a steel plate, a metal plate, a plastic plate, a film, a ceramic plate, concrete, wood, glass, and fabric, the substrate not being a transparent member;
wherein the glossy layer comprises a translucent ink;
wherein on a surface of the substrate, a first region including a first protrusion and a second region including a second protrusion are formed;
wherein the first protrusion includes a part which is formed along a first direction;
wherein the second protrusion includes a part which is formed along a second direction different from the first direction;
wherein the first protrusion includes a curved part which is curved from the first direction to the second direction and connected to the second region, and
wherein the curved part smoothly changes direction from the first direction to the second direction.

2. The printed matter of claim 1, wherein the second direction is tilted by 10 to 80° with respect to the first direction.

3. The printed matter of claim 1, further comprising a design layer between the substrate and the glossy layer.

4. The printed matter of claim 3, wherein the design layer is printed with a wood pattern.

5. The printed matter of claim 1, wherein the substrate consists of a wood raw material.

6. A gloss-imparting method of providing a glossy layer by applying a translucent ink on a substrate to impart a surface gloss,
the substrate being at least one selected from the group consisting of a steel plate, a metal plate, a plastic plate, a film, a ceramic plate, concrete, wood, glass, and fabric, the substrate not being a transparent member,
the gloss-imparting method comprising:
a step of applying the translucent ink so as to form on a surface of the glossy layer a first region including a first protrusion and a second region including a second protrusion;
wherein:
the first protrusion includes a part which is formed along a first direction;
the second protrusion includes a part which is formed along a second direction different from the first direction;

the first protrusion is formed so as to include a curved part which is curved from the first direction to the second direction and connected to the second region, and the curved part smoothly changes direction from the first direction to the second direction.

7. A manufacturing method of a printed matter having a surface gloss, comprising:

an ink-applying step of applying a translucent ink on a substrate to provide a glossy layer by an inkjet method;

the ink-applying step being a step of applying the translucent ink so as to form on a surface of the substrate a first region including a first protrusion and a second region including a second protrusion;

wherein the first protrusion includes a part which is formed along a first direction;

wherein the second protrusion includes a curved part which is curved along a second direction different from the first direction;

wherein the first protrusion is formed so as to include a curved part which is curved from the first direction to the second direction and connected to the second region;

wherein the curved part smoothly changes direction from the first direction to the second direction; and wherein the substrate is at least one selected from the group consisting of a steel plate, a metal plate, a plastic plate, a film, a ceramic plate, concrete, wood, glass, and fabric, the substrate not being a transparent member.

8. A printed matter, comprising:

a substrate and a glossy layer provided on the substrate;

wherein the glossy layer comprises a translucent ink;

wherein on a surface of the substrate, a first region including a first protrusion and a second region including a second protrusion are formed;

the substrate being a translucent substrate, the printed matter further comprising;

a design layer;

wherein the substrate, the glossy layer, and the design layer are sequentially formed;

wherein the first protrusion includes a part which is formed along a first direction;

wherein the second protrusion includes a part which is formed along a second direction different from the first direction;

wherein the first protrusion includes a curved part which is curved from the first direction to the second direction and connected to the second region; and wherein the curved part smoothly changes direction from the first direction to the second direction.

* * * * *